(12) United States Patent
Nakayama et al.

(10) Patent No.: US 12,098,261 B2
(45) Date of Patent: Sep. 24, 2024

(54) NEAR-INFRARED ABSORBING MATERIAL FINE PARTICLE DISPERSION BODY, NEAR-INFRARED ABSORBING BODY, NEAR-INFRARED ABSORBING SUBSTANCE LAMINATED BODY AND COMBINED STRUCTURE FOR NEAR INFRARED ABSORPTION

(71) Applicant: SUMITOMO METAL MINING CO., LTD., Tokyo (JP)

(72) Inventors: Hiroki Nakayama, Isa (JP); Hiroshi Kobayashi, Isa (JP); Kenji Fukuda, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 1057 days.

(21) Appl. No.: 16/968,714

(22) PCT Filed: Feb. 1, 2019

(86) PCT No.: PCT/JP2019/003656
§ 371 (c)(1),
(2) Date: Nov. 16, 2020

(87) PCT Pub. No.: WO2019/155999
PCT Pub. Date: Aug. 15, 2019

(65) Prior Publication Data
US 2021/0070961 A1 Mar. 11, 2021

(30) Foreign Application Priority Data
Feb. 8, 2018 (JP) ................................. 2018-021100

(51) Int. Cl.
*C08K 3/22* (2006.01)
*C01G 41/02* (2006.01)
(Continued)

(52) U.S. Cl.
CPC ............... *C08K 3/22* (2013.01); *C01G 41/02* (2013.01); *C07F 7/1804* (2013.01);
(Continued)

(58) Field of Classification Search
CPC ............................. C08K 3/22; C08K 5/5419; C08K 2003/2258; C07F 7/1804; G02B 5/208;
(Continued)

(56) References Cited

U.S. PATENT DOCUMENTS 3,907,750 A * 9/1975 Schaschel ............... C08L 83/04
525/477
2006/0178254 A1 8/2006 Takeda et al.
(Continued)

FOREIGN PATENT DOCUMENTS

CN 102341233 A 2/2012
CN 107083101 A 8/2017
(Continued)

OTHER PUBLICATIONS

Jan. 5, 2022 extended Search Report issued in European Patent Application No. 19750968.0.
(Continued)

*Primary Examiner* — Bijan Ahvazi
(74) *Attorney, Agent, or Firm* — Oliff PLC (57) ABSTRACT

Provided are a near-infrared absorbing material fine particle dispersion, a near-infrared absorber, and a laminated structure for near-infrared absorption, which can exhibit higher near-infrared absorption property, compared to near-infrared fine particle dispersions, near-infrared absorber, and laminated structures for near-infrared absorption, containing tungsten oxides or composite tungsten oxides according to the conventional art. Also provided is a near-infrared absorbing material fine particle dispersion, wherein composite tungsten oxide fine particles, each particle containing a (Continued)

hexagonal crystal structure, and a silane compound are contained in an acrylic resin.

10 Claims, 2 Drawing Sheets

(51) Int. Cl.
*C07F 7/18* (2006.01)
*C08K 5/5419* (2006.01)
*G02B 5/20* (2006.01)

(52) U.S. Cl.
CPC ............ *C08K 5/5419* (2013.01); *G02B 5/208* (2013.01); *C01P 2002/70* (2013.01); *C01P 2004/64* (2013.01); *C08K 2003/2258* (2013.01)

(58) Field of Classification Search
CPC ... C01G 41/02; C01P 2002/70; C01P 2004/64
See application file for complete search history.

(56) References Cited

U.S. PATENT DOCUMENTS

| | | | | |
|---|---|---|---|---|
| 2010/0220388 | A1* | 9/2010 | Suzuki | B32B 17/10788 359/359 |
| 2011/0237816 | A1* | 9/2011 | Gehrig | C08G 77/08 556/451 |
| 2011/0318578 | A1 | 12/2011 | Hashimoto et al. | |
| 2015/0030802 | A1 | 1/2015 | Chen et al. | |
| 2018/0170021 | A1 | 6/2018 | Machida et al. | |
| 2018/0208803 | A1* | 7/2018 | Okada | C09J 11/04 |
| 2020/0291190 | A1* | 9/2020 | Swier | C08G 77/80 |

FOREIGN PATENT DOCUMENTS

| | | | | |
|---|---|---|---|---|
| JP | 2005-232334 A | | 9/2005 | |
| JP | 2011-080003 A | | 4/2011 | |
| JP | 2014094493 A | * | 5/2014 | ............ B32B 27/00 |
| JP | 2016-155256 A | | 9/2016 | |
| JP | 6269805 B1 | | 1/2018 | |
| TW | 201714928 A | | 5/2017 | |
| WO | 2005/037932 A1 | | 4/2005 | |
| WO | WO-2005078012 A2 | * | 8/2005 | ............ C08L 101/00 |
| WO | 2017/073691 A1 | | 5/2017 | |
| WO | 2018/123096 A1 | | 7/2018 | |

OTHER PUBLICATIONS

Aug. 11, 2020 International Preliminary Report on Patentability issued in International Patent Application No. PCT/JP2019/003656.

Apr. 9, 2019 International Search Report issued in International Patent Application No. PCT/JP2019/003656.

* cited by examiner

NEAR-INFRARED ABSORBING MATERIAL FINE PARTICLE DISPERSION BODY, NEAR-INFRARED ABSORBING BODY, NEAR-INFRARED ABSORBING SUBSTANCE LAMINATED BODY AND COMBINED STRUCTURE FOR NEAR INFRARED ABSORPTION

TECHNICAL FIELD

The present invention relates to a near-infrared absorbing material fine particle dispersion, a near-infrared absorber, a near-infrared absorber laminate, and a laminated structure for near-infrared absorption, having transparency in a visible light region and absorption property in a near-infrared region.

DESCRIPTION OF RELATED ART

It is generally known that a material containing free electrons exhibits a reflection/absorption response due to plasma oscillation, with respect to an electromagnetic wave of a wavelength from 200 nm to 2,600 nm, which is close to solar radiation region. It is known that when the particles of the powder forming the material are fine particles having diameters smaller than the wavelength of light, the geometric scattering of the material in the visible light region (wavelength: 380 nm to 780 nm) is reduced so that transparency in the visible light region is achieved.

The term "transparency" used in the present invention means high visible light transmittance with less scattering of light in the visible light region.

Meanwhile, the applicant has disclosed in Patent Document 1 an infrared shielding material fine particle dispersion in which tungsten oxide fine particles and/or composite tungsten oxide fine particles, each particle having a particle size of 1 nm or more and 800 nm or less, are dispersed in a solid medium, the infrared shielding material fine particle dispersion transmitting visible radiations while efficiently shielding near-infrared radiations, requiring no large-scale production equipment for film formation onto a substrate, nor heat treatment at high temperature after film formation.

PRIOR ART DOCUMENT

Patent Document

[Patent Document 1] Re-publication of PCT International Publication No. WO2005/037932

SUMMARY OF THE INVENTION

Problems to be Solved by the Invention

However, after further studies, the present inventors have found that the dispersion described in Patent Document 1 has a problem in that near-infrared absorbing material fine particles may aggregate in the solid medium so that the transparency decreases in some cases.

In view of such a situation, an object of the present invention is to provide a near-infrared absorbing material fine particle dispersion, a near-infrared absorber, and a laminated structure for near-infrared absorption, which can exhibit higher near-infrared absorption property while securing higher transparency, compared to near-infrared fine particle dispersions, near-infrared absorbers, and laminated structures for near-infrared absorption, containing tungsten oxides or composite tungsten oxides, according to the conventional art

Means for Solving the Problem

In order to solve the above-described problems, the present inventors have studied. Acrylic resins have transparency similar to or superior to that of glass, as well as excellent weather resistance, chemical resistance, and optical properties. For this reason, the present inventors have studied based on the viewpoint of suppressing aggregation of the near-infrared absorbing material fine particles in the acrylic resin. As a result of the study, the present inventors have found configurations of: a near-infrared absorbing material fine particle dispersion in which the composite tungsten oxide fine particles and a silane compound are contained in an acrylic resin, and a near-infrared absorber, near-infrared absorber laminate, and laminated structure for near-infrared absorption, using the near-infrared absorbing material fine particle dispersion; and have attained the present invention.

Namely, a first invention to solve the above-described problem provides a near-infrared absorbing material fine particle dispersion including, composite tungsten oxide fine particles, and a silane compound, in an acrylic resin.

A second invention provides the near-infrared absorbing material fine particle dispersion according to the first invention, wherein the silane compound is one or more kinds selected from a silane coupling agent, an alkoxysilane compound, and a silicone resin.

A third invention provides the near-infrared absorbing material fine particle dispersion according to the second invention, wherein the silane compound has one or more kinds of functional groups selected from an amino group, an epoxy group, a mercapto group, a (meth)acrylic group, a vinyl group, a phenyl group, an isocyanate group, and an imidazole group.

A fourth invention provides the near-infrared absorbing material fine particle dispersion according to the second invention, wherein a monomer unit forming the silicone resin is represented by R—$SiO_{1.6}$ (where R represents a hydrogen atom or an organic group).

A fifth invention provides the near-infrared absorbing material fine particle dispersion according to the second or fourth invention, wherein the weight average molecular weight of the silicone resin is 1,500 or more and 200,000 or less.

A sixth invention provides the near-infrared absorbing material fine particle dispersion according to any one of the first to fifth inventions, wherein the dispersed particle size of the composite tungsten oxide fine particle is 1 nm or more and 200 nm or less.

A seventh invention provides the near-infrared absorbing material fine particle dispersion according to any one of the first to sixth inventions, wherein the composite tungsten oxide fine particles are represented by general formula $M_xW_yO_z$ (wherein M element is one or more kinds of elements selected from H, He, alkali metal, alkaline earth metal, rare earth element, Mg, Zr, Cr, Mn, Fe, Ru, Co, Rh, Jr, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.20 \leq x/y \leq 0.37$, $2.2 \leq z/y \leq 3.0$).

An eighth invention provides
the near-infrared absorbing material fine particle dispersion according to the seventh invention,
wherein the M element is one or more kinds of elements selected from Cs and Rb.

A ninth invention provides
the near-infrared absorbing material fine particle dispersion according to any one of the first to eighth inventions,
wherein the composite tungsten oxide fine particles include composite tungsten oxide fine particles, each particle having a hexagonal crystal structure.

A tenth invention provides
the near-infrared absorbing material fine particle dispersion according to any one of the first to ninth inventions,
wherein the surface of the near-infrared absorbing material fine particle is coated with an oxide containing one or more kinds of elements selected from Si, Ti, Zr, and Al.

An eleventh invention provides
a near-infrared absorber,
which is obtained by molding the near-infrared absorbing material fine particle dispersion according to any one of the first to tenth inventions into any one shape selected from a plate, a film, and a thin film.

A twelfth invention provides
a near-infrared absorber laminate,
wherein the near-infrared absorber according to the eleventh invention is laminated on a base material.

A thirteenth invention provides
a laminated structure for near-infrared absorption, including the near-infrared absorber according to the eleventh invention present between two or more laminated plates selected from sheet-glass, plastic plate, and plastic plate containing fine particles having near-infrared absorption function.

A fourteenth invention provides
a laminated structure for near-infrared absorption,
wherein the near-infrared absorber laminate according to the twelfth invention is opposed to a laminated plate selected from sheet glass, plastic plate, and plastic plate containing fine particles having near-infrared absorption function, or is present between two or more laminated plates selected from sheet glass, plastic plate, and plastic plate containing fine particles having near-infrared absorption function.

Advantage of the Invention

The near-infrared absorbing material fine particle dispersion according to the present invention provides a near-infrared absorbing material fine particle dispersion, a near-infrared absorber, a near-infrared absorber laminate, and a laminated structure for near-infrared absorption, which exhibit higher near-infrared absorption property while securing transparency and have excellent optical properties, compared to near-infrared absorbing material fine particle dispersions, near-infrared absorbers, near-infrared absorber laminates, and laminated structures for near-infrared absorption according to the conventional art.

DETAILED DESCRIPTION OF THE INVENTION

The near-infrared absorbing material fine particle dispersion according to the present invention includes composite tungsten oxide fine particles and a silane compound in an acrylic resin.

In the near-infrared absorbing material fine particle dispersion according to the present invention having the above-described configuration, the composite tungsten oxide fine particles which have been mechanically pulverized under predetermined conditions are kept dispersed in the acrylic resin including the silane compound. The near-infrared absorbing material fine particle dispersion according to the present invention having the configuration can be used, for example, for providing the near-infrared absorber having a film-like shape, a thin film-like shape, or the like on material of the base material having a low heatproof temperature such as a resinous material to obtain the near-infrared absorber laminate. Furthermore, since large-scale equipment is not required for the production or formation of the near-infrared absorber or the near-infrared absorber laminate, the production equipment is advantageously inexpensive.

Although the near-infrared absorbing material according to the present invention is a conductive material, it is dispersed as fine particles in the matrix of an acrylic resin so that particles are discretely dispersed. Therefore, the near-infrared absorbing material according to the present invention exhibits radio wave transmission, and has versatility, for example, as various window materials.

The near-infrared absorbing material fine particle dispersion according to the present invention is molded into any one shape selected from a plate, a film, and a thin film to obtain the near-infrared absorber according to the present invention.

In the near-infrared absorber laminate according to the present invention, the near-infrared absorber is laminated on a base material.

The laminated structure for near-infrared absorption according to the present invention is: a near-infrared absorbing material fine particle dispersion which takes a form of the near-infrared absorber and is present between two or more laminated plates selected from sheet glass, plastic plate, and plastic plate containing fine particles having a solar radiation absorption function; or a combination of a near-infrared absorber laminate and laminated plates selected from sheet glass, plastic plate, and plastic plate containing fine particles having a solar radiation absorption function.

The present invention will be described in detail hereafter in an order of: 1. Acrylic resin, 2. Silane compound, 3. Composite tungsten oxide fine particles, 4. Method for producing composite tungsten oxide fine particles, 5. Near-infrared absorbing material fine particle dispersion liquid and method for production thereof, 6. Near-infrared absorbing material fine particle dispersion and method for production thereof, 7. Near-infrared absorber and method for production thereof, 8. Near-infrared absorber laminate and method for production thereof, 9. Laminated structure for near-infrared absorption and method for production thereof, and 10. Summary.

1. Acrylic Resin

Examples of acrylic resin which is the solid medium according to the present invention include polymers or copolymers obtained from methyl methacrylate, ethyl methacrylate, propyl methacrylate, or butyl methacrylate as a main raw material, using acrylate ester having $C_1$ to $C_8$ alkyl group, vinyl acetate, styrene, acrylonitrile, methacrylonitrile or the like as a copolymerizable component as necessary. Further, the acrylic resin polymerized in several stages can also be used.

2. Silane Compound

When the silane compound according to the present invention is mixed with the near-infrared absorbing material fine particles and acrylic resin described later, they are simultaneously mixed and melt-kneaded, so that de-aggregation of the near-infrared absorbing material fine particles is promoted, and effect of securing the state of dispersion of the near-infrared absorbing material fine particles in the acrylic resin is exhibited as well.

Specifically, the near-infrared absorbing material fine particles described later, the silane compound, and the acrylic resin as the above-described solid medium are uniformly mixed, and thereafter melt-kneaded to obtain the near-infrared absorbing material fine particle dispersion. The resulting near-infrared absorbing material fine particle dispersion is molded to obtain the near-infrared absorber.

The addition amount of the silane compound is preferably 1 part by mass or more and 200 parts by mass or less with respect to 100 parts by mass of the near-infrared absorbing material fine particles.

The reason is as follows. The addition amount of the silane compound being 1 part by mass or more with respect to 100 parts by mass of the near-infrared absorbing material fine particles is preferred from the viewpoint of attaining the addition effect of the silane compound, whereas the addition amount of the silane compound being 200 parts by mass or less is preferred from the viewpoint of easy melt-kneading of the silane compound into the acrylic resin.

The silane compound preferably has one or more kinds of functional groups selected from an amino group, an epoxy group, a mercapto group, a (meth)acrylic group, a vinyl group, a phenyl group, an isocyanate group, and an imidazole group.

Moreover, the silane compound is preferably one or more kinds selected from a silicone resin, a silane coupling agent, and an alkoxysilane compound.

The silane compound preferably used in the present invention will be hereinafter described in an order of: (1) Silicone resin, (2) Silane coupling agent, and (3) Alkoxysilane compound.

(1) Silicone Resin

In the silicone resin used in the present invention, a monomer unit forming the silicone resin is preferably represented by general formula: $R-SiO_{1.6}$ (where R is a hydrogen atom or an organic group). Note that the organic group is a hydrocarbon group represented by general formula:

The weight average molecular weight of the silicone resin is preferably 1,500 or more and 200,000 or less. With the average molecular weight of the silicone resin of 1,500 or more, the near-infrared absorbing material fine particles can be sufficiently dispersed. On the other hand, with the average molecular weight of the silicone resin of 200,000 or less, the silicone resin can be easily contained in the acrylic resin.

Examples of the commercially available silicone resin used in the present invention preferably include: KR-480 (manufactured by Shin-Etsu Silicones); Z-6018, 220 FLAK, FCA-107, 233 FLAKE, 249 FLAKE, SH 6018 FLAKE, 255 FLAKE, 217 FLAKE (all manufactured by Dow Corning Toray Co., Ltd); SILRES 603, SILRES 604, SILRES 605, SILRES H44, SILRES SY300, SILRES REN100, SILRES SY430, SILRES IC836 (all manufactured by Wacker Asahikasei Silicone Co., Ltd); TSR 160 (manufactured by Momentive Performance Materials).

(2) Silane Coupling Agent

Examples of the commercially available silane coupling agent used in the present invention preferably include: KBM-30, KBM-402, KBM-403, KBE-402, KBE-403, KBM-1043, KBM-502, KBM-503, KBE-502, KBE-503, KBM-5103, KBM-602, KBM-603, KBM-903, KBE-903, KBE-9103P, KBM-573, KBM-575 (all manufactured by Shin-Etsu Silicones).

(3) Alkoxysilane Compound

As for an alkoxysilane compound used in the present invention, specific examples of such an alkoxysilane compound include tetramethoxysilane, tetraethoxysilane, tetraisopropoxysilane, tetra-n-butoxysilane, trimethoxysilane, triethoxysilane, methyltrimethoxysilane, methyltriethoxysilane, methyltriisopropoxysilane, methyltri-n-butoxysilane, ethyltrimethoxysilane, n-propyltrimethoxysilane, isopropyltriethoxysilane, n-butyltrimethoxysilane, isobutyltriethoxysilane, sec-butyltriisopropoxysilane, tert-butyltrimethoxysilane, tert-butyltriethoxysilane, n-hexyltrimethoxysilane, thexyltrimethoxysilane, thexyltriethoxysilane, cyclohexyltrimethoxysilane, cyclohexyltriethoxysilane, isobutyltrimethoxysilane, decyltrimethoxysilane, vinyltrimethoxysilane, vinyltri(2-methoxymethyl)silane, ethynyltrimethoxysilane, allyltrimethoxysilane, allyltriethoxysilane, phenyltrimethoxysilane, benzyltrimethoxysilane, 3-chloropropyltrimethoxysilane, 3,3,3-trifluoropropyltri(3,3,3-trifluoroethoxy)silane, 3-methacryloxypropyltrimethoxysilane, 3-acryloxypropyltrimethoxysilane, 2-cyanoethyltrimethoxysilane, 2-cyanoethyltriethoxysilane, diethoxysilane, methyldimethoxysilane, methyldiethoxysilane, dimethyldimethoxysilane, dimethyldiethoxysilane, dimethyldiisopropoxysilane, dimethyldi-n-butoxysilane, methylpropyldimethoxysilane, methyl-tert-butyldimethoxysilane, methyl-tert-butyldiethoxysilane, methyl-n-hexyldimethoxysilane, methylthexyldimethoxysilane, cyclohexylmethyldimethoxysilane, cyclohexylmethyldiethoxysilane, methylvinyldimethoxysilane, allylmethyldimethoxysilane, methylphenyldimethoxysilane, 2-cyanoethylmethyldimethoxysilane, methyl-isopropoxydimethoxysilane, methyl-tert-butoxydimethoxysilane, di-n-propyldimethoxysilane, di-tert-butyldimethoxysilane, dicyclopentyldimethoxysilane, dicyclohexyldimethoxysilane, diallyldimethoxysilane, diphenyldimethoxysilane, diphenyldiethoxysilane, dimethylmethoxysilane, dimethyleththexyloxysilane, trimethylmethoxysilane, trimethylethoxysilane, trimethylcyclohexyloxysilane, trimethylphenoxysilane, isopropyldimethylethoxysilane, tert-butyldimethylmethoxysilane, tert-butyldimethylethoxysilane, tert-butyldimethylcyclohexyloxysilane, tert-butyldimethylphenoxysilane, dimethylthexylmethoxysilane, dimethylthexylethoxysilane, dimethylthexylcyclohexyloxysilane, dimethylthexylphenoxysilane, cyclohexyldimethylmethoxysilane, triethylmethoxysilane, triethylethoxysilane, triethylcyclohexyloxysilane, triethylphenoxysilane, triisopropylmethoxysilane, tricyclohexylmethoxysilane, triphenylmethoxysilane.

Examples of the commercially available alkoxysilane compound used in the present invention preferably include: KBM-13, KBM-22, KBM-103, KBE-13, KBE-22, KBE-103, KBM-3033, KBE-3033, KBM-3063, KBE-3063, KBE- 3083, KBM-3103C, KBM-3066, KBM-7103 (all manufactured by Shin-Etsu Silicones); Z-2306, Z-6210, Z-6265, Z-6341, Z-6366, Z-6383, Z-6582, Z-6583, Z-6586, Z-6125 (all manufactured by Dow Corning Toray Co., Ltd).

3. Composite Tungsten Oxide Fine Particles

The composite tungsten oxide fine particles used for the near-infrared absorbing material fine particle dispersion according to the present invention are represented by general formula $M_xW_yO_z$ (where M element is one or more kinds of elements selected from H, He, alkali metal, alkaline earth metal, rare earth element, Mg, Zr, Cr, Mn, Fe, Ru, Co, Rh, Jr, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.20 \leq x/y \leq 0.37$, $2.2 \leq z/y \leq 3.0$).

Generally, tungsten trioxide ($WO_3$) has low absorption/reflection property in the near-infrared region because effective free electrons do not exist therein. Therefore, it is not effective as the infrared absorbing material. Here, it is known that free electrons are generated in the tungsten oxide by setting a ratio of oxygen to tungsten in the tungsten trioxide to be smaller than 3.

M element is added to the tungsten oxide to obtain the composite tungsten oxide.

With this configuration, free electrons are generated in the composite tungsten oxide, and the absorption property derived from the free electrons are exhibited in the near-infrared region, and the composite tungsten oxide becomes effective as a near-infrared absorbing material around a wavelength of 1,000 nm. The near-infrared absorbing material fine particle dispersion according to the present invention includes the above-described composite tungsten oxide as the infrared absorbing material fine particles, and the composite tungsten oxide absorbs the near-infrared radiation and converts it into heat. Therefore, the near-infrared absorbing material fine particle dispersion has the near-infrared absorption property.

From this viewpoint, the near-infrared absorbing material fine particles according to the present invention preferably include the composite tungsten oxide fine particles, each particle having a hexagonal crystal structure.

For the composite tungsten oxide, since the above-described control of the amount of oxygen and the addition of an element that generates free electrons are used in combination, a more efficient near-infrared absorbing material can be obtained. Specifically, in the composite tungsten oxide, general formula of the near-infrared absorbing material in which control of the amount of oxygen and the addition of M element that generates free electrons are used in combination, is represented as $M_xW_yO_z$ (where M is the M element, W is tungsten, and O is oxygen), wherein a relationship of $0.001 \leq x/y \leq 1$, preferably $0.20 \leq x/y \leq 0.37$ is satisfied.

From the viewpoint of stability in the composite tungsten oxide with M element added thereto, the M element is more preferably one or more kinds of elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I.

Moreover, from the viewpoint of stability in the $M_xW_yO_z$ with M element added thereto, the M element is more preferably one or more kinds of elements selected from alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re.

In addition, it is more preferable that the M element belongs to alkali metal, alkaline earth metal element, transition metal element, 4B group element, or 5B group element from a viewpoint of improving optical properties and weather resistance as a near-infrared absorbing material.

Next, the value of z/y indicating the control of the amount of oxygen in the $M_xW_yO_z$ will be described. In the infrared absorbing material represented by $M_xW_yO_z$, the value of z/y is preferably $2.2 \leq z/y \leq 3.0$, because the same mechanism as the near-infrared absorbing material represented by $W_yO_z$ described above works depending on the value of z/y, and even at z/y=3.0, there is a supply of the free electrons due to the addition amount of the M element described above.

Here, Cs and Rb are the most preferred M elements. However, the M element is not limited to the above Cs and Rb. Even when the M element is an element other than Cs or Rb, it may be present as an added M element in the hexagonal void formed by the units of $WO_6$.

When each composite tungsten oxide fine particles having the hexagonal crystal structure has a uniform crystal structure, the addition amount of the added M element is $0.001 \leq x/y \leq 1$, preferably $0.2 \leq x/y \leq 0.5$, more preferably $0.20 \leq x/y \leq 0.37$, and most preferably x/y=0.33. The reason is as follows. Theoretically, when satisfying z/y=3, x/y=0.33 is established, and the added M element is considered to be arranged in all hexagonal voids.

Here, the present inventors have repeatedly studied in consideration of further improving the near infrared absorption function of the composite tungsten oxide fine particles, and have achieved a configuration in which the amount of the contained free electrons is further increased.

Namely, as a measure to increase the amount of the free electrons, the inventors have found a measure in which a mechanical treatment is applied to the composite tungsten oxide fine particles to give appropriate strain and deformation to the contained hexagonal crystals. In the hexagonal crystal given the appropriate strain and deformation, it is considered that the amount of the free electrons increases due to a change in an overlapping state of electron orbitals in the atoms constituting the crystallite structure.

Therefore, the inventors have studied as follows: in a dispersion step when producing the near-infrared absorbing material fine particle dispersion liquid from the fine particles of the composite tungsten oxide produced by a firing step, the fine particles of the composite tungsten oxide are pulverized under predetermined conditions, thereby giving strain and deformation to the crystal structure and increasing the amount of the free electrons, and the near-infrared absorption function of the composite tungsten oxide fine particles is further improved.

Further, it is found that each particle of the near-infrared absorbing material fine particles according to the present invention preferably has a particle size of 1 nm or more and 200 nm or less, and more preferably 100 nm or less. Then, from a viewpoint of exhibiting more excellent near-infrared absorption property, the particle size is preferably 10 nm or more and 100 nm or less, more preferably 10 nm or more and 80 nm or less, still more preferably 10 nm or more and 60 nm or less, and most preferably 10 nm or more and 40 nm or less. When the particle size is in the range of 10 nm or more and 40 nm or less, the most excellent infrared absorption property is found to be exhibited.

The particle size used herein is an average value of the sizes of the individual near-infrared absorbing material fine particles which are not aggregated, that is, an average value of the primary particle size, and is the average particle size of the near-infrared absorbing material fine particles contained in the near-infrared absorbing material fine particle dispersion described later. Therefore, the particle size does not include the size of the aggregate of the composite tungsten oxide fine particles, and is different from the dispersed particle size.

The average particle size is calculated from an electron microscope image of the near-infrared absorbing material fine particles.

The average particle size of the composite tungsten oxide fine particles contained in the infrared absorbing material fine particle dispersion can be obtained by measuring the primary particle sizes of 100 composite tungsten oxide fine particles using an image processing device and calculating the average value thereof, from a transmission electron microscope image of thinned samples of the composite tungsten oxide fine particles taken out by cross-section processing. A microtome, a cross section polisher, a focused ion beam (FIB) apparatus, or the like can be used for cross-section processing for taking out the thinned samples.

Further, it is found that the composite tungsten oxide fine particle is preferably a single crystal.

The fact that the composite tungsten oxide fine particle is a single crystal can be confirmed from an electron microscope image by a transmission electron microscope or the like in which no crystal grain boundaries are observed inside each fine particle, and only uniform lattice fringes are observed. Further, the fact that the amorphous phase volume ratio is 50% or less in the composite tungsten oxide fine particles can be confirmed from the same electron microscope image in which uniform lattice fringes are observed throughout the fine particles, and there are almost no unclear lattice fringes. Therefore, the amorphous phase volume ratio in the composite tungsten oxide fine particles can be confirmed from the observation of the ratio of the region in which uniform lattice fringes are observed in the fine particles to the region in which there are unclear lattice fringes.

Further, since the amorphous phase exists on the outer periphery of each fine particle in many cases, the volume ratio of the amorphous phase can be calculated by paying attention to the outer periphery of each fine particle in many cases. For example, in a spherical composite tungsten oxide fine particle, when the amorphous phase with unclear lattice fringes exists in a layered manner on the outer periphery of the fine particle, the amorphous phase volume ratio in the composite tungsten oxide fine particles is 50% or less, as long as the thickness of the layer is 10% or less of the particle size.

The near-infrared absorbing material fine particle dispersion containing the composite tungsten oxide fine particles according to the present invention greatly absorbs light in the near-infrared region, particularly around the wavelength of 1,000 nm, and thus their transmission color tone is frequently blue to green.

Furthermore, it is necessary to consider the aggregation of the near-infrared absorbing material fine particles in terms of the dispersed particle size, for the light scattering in the near-infrared absorbing material fine particle dispersion, described later in "6. Near-infrared absorbing material fine particle dispersion, and method for production thereof." Further, the dispersed particle size of the near-infrared absorbing material fine particle can be selected depending on the intended use.

The dispersed particle size of the above-described near-infrared absorbing material fine particle is a concept including a diameter of an aggregate of the composite tungsten oxide fine particles, which is different from the concept of the particle size of the above-described near-infrared absorbing material according to the present invention.

First, when used for applications while maintaining transparency, it is more preferable to have a dispersed particle size of 800 nm or less. It is because particle with a dispersed particle size smaller than 800 nm can maintain the visibility in the visible light region without completely shielding light due to scattering, and at the same time efficiently maintain the transparency. Particularly, when the transparency of the visible light region is focused, it is preferable to further consider the scattering due to particles.

When the reduction of the scattering due to the particles is focused, the dispersed particle size is preferably 200 nm or less, more preferably 10 nm or more and 200 nm or less, and still more preferably 10 nm or more and 100 nm or less. The reason is as follows. When the dispersed particle size is small, the infrared absorbing layer can be prevented from looking like fogged glass and thus losing clear transparency due to geometric or Mie scattering. In other words, the dispersed particle size of 200 nm or less corresponds to a region where the Rayleigh scattering is strong with the above-described geometrical scattering or Mie scattering being reduced. In the Rayleigh scattering region, the scattered light is in proportion to the sixth power of the dispersed particle size. Therefore, with the decrease in the dispersed particle size, the scattering is reduced and the transparency is improved. In addition, when the dispersed particle size is 100 nm or less, the scattered light extremely decreases, which is preferable. From the viewpoint of avoiding light scattering, the smaller dispersed particle size is more preferable. When the dispersed particle size is 10 nm or more, industrial production is easy.

When the above-described dispersed particle size is 800 nm or less, the haze value of the near-infrared absorbing material fine particle dispersion in which the near-infrared absorbing material fine particles are dispersed in a medium can be reduced to 10% or less when the visible light transmittance is 85% or less. In particular, when the dispersed particle size is 100 nm or less, the haze value can be reduced to 1% or less.

The dispersed particle size of the near-infrared absorbing fine particle according to the present invention is preferably 800 nm or less. This is because the near-infrared absorption of the composite tungsten oxide which is a near-infrared absorbing fine particle is based on the light absorption and scattering peculiar to nanoparticles called "localized surface plasmon resonance".

In other words, when the dispersed particle size of the composite tungsten oxide is 800 nm or less, localized surface plasmon resonance occurs, and the near-infrared absorbing fine particles efficiently absorb near-infrared radiations irradiated on the near-infrared absorbing material fine particle dispersion according to the present invention and easily convert them into thermal energy.

When a dispersed particle size is 200 nm or less, the localized surface plasmon resonance becomes stronger and the irradiated near-infrared radiation is absorbed more strongly, which is more preferable.

Further, when the dispersed particle size of the near-infrared absorbing fine particle according to the present invention is 200 nm or less, the near-infrared absorption property and transparency can be maintained.

Further, the near-infrared absorber produced by dispersing the fine particles in an appropriate solid medium or on the surface of the solid medium can more efficiently absorb solar radiation, particularly light in the near-infrared region, without utilizing a light interference effect and at the same time transmits light in the visible light region, compared to a layer produced by a dry method like a vacuum deposition method such as a sputtering method, a vapor deposition method, an ion plating method, and a chemical vapor deposition method (CVD method), or a layer produced by a CVD method or a spraying method.

4. Method for Producing Composite Tungsten Oxide Fine Particles

The composite tungsten oxide fine particles represented by the general formula MxWyOz according to the present invention can be produced by a solid phase reaction method for applying heat treatment to a mixture of a tungsten compound as a starting material of the tungsten oxide fine particles and a simple substance or compound containing the M element mixed at a ratio of $0.20 \leq x/y \leq 0.37$ in a reducing gas atmosphere, or in a mixed gas atmosphere of a reducing gas and an inert gas, or in an inert gas atmosphere. After passing through the heat treatment, the composite tungsten oxide fine particles, micronized by pulverization treatment or the like so as to have a predetermined particle size, have sufficient near-infrared absorbing power and have preferable properties as near-infrared absorbing material fine particles.

As a tungsten compound which is a starting material for obtaining the composite tungsten oxide fine particles represented by the above-described general formula MxWyOz according to the present invention, it is possible to use a mixed powder of one or more kinds of powders selected from tungsten trioxide powder, tungsten dioxide powder, or a hydrate of tungsten oxide, or tungsten hexachloride powder, or ammonium tungstate powder, or a tungsten oxide hydrate powder obtained by dissolving tungsten hexachloride in alcohol and drying, or a tungsten oxide hydrate powder obtained by dissolving tungsten hexachloride in alcohol, making it precipitated by adding water, and drying, or a tungsten compound powder obtained by drying an aqueous ammonium tungstate solution, and a metal tungsten powder, and powder of a simple substance or compound containing the M element, compounded at a ratio of $0.20 \leq x/y \leq 0.37$.

Further, when the tungsten compound as the starting material for obtaining the composite tungsten oxide fine particles is a solution or a dispersion liquid, each element can easily be mixed uniformly.

From this viewpoint, it is also preferable that the starting material of the composite tungsten oxide fine particles is powder obtained by mixing an alcoholic solution of tungsten hexachloride or an aqueous solution of ammonium tungstate with a solution of a compound containing the M element, and then drying the mixture.

From a similar viewpoint, it is also preferable that the starting material of the composite tungsten oxide fine particles is powder obtained by mixing a dispersion liquid, prepared by dissolving tungsten hexachloride in alcohol and then adding water to form a precipitate, with powder of a simple substance or compound containing the M element or a solution of the compound containing the M element, and then drying the mixture.

Examples of the compound containing the M element include, but are not limited to, a tungstate salt, a chloride salt, a nitrate salt, a sulfate salt, an oxalate salt, an oxide, a carbonate salt, and a hydroxide of the M element. The compound which can be in a solution state may be acceptable. Further, in the industrial production of the composite tungsten oxide fine particles, when tungsten oxide hydrate powder or tungsten trioxide, and a carbonate salt or hydroxide of M element are used, hazardous gases and the like are not generated at the stage of the heat treatment or the like, which is preferable for a production method.

Now, explanation will be given for heat treatment conditions to obtain the composite tungsten oxide using a mixture of the tungsten compound, which is a starting material for obtaining the composite tungsten oxide fine particles, and a compound containing the M element.

First, the above-described mixture which is a starting material is heat-treated in a reducing gas atmosphere, or in a mixed gas atmosphere of a reducing gas and an inert gas, or in an inert gas atmosphere.

Among the heat treatment conditions, the preferable heat treatment conditions in a reducing atmosphere include heat treatment of powder in a reducing gas atmosphere at 100° C. or more and 850° C. or less, the powder being a mixture of the tungsten compound starting material and a simple substance or compound containing M element or obtained by mixing the solution or dispersion liquid of the tungsten compound starting material and the solution or dispersion liquid of the compound containing the M element, and subsequently drying the mixture. When the heat treatment temperature is 100° C. or more, the reduction reaction proceeds sufficiently, which is preferable. Further, when the temperature is 850° C. or less, the reduction does not proceed excessively, which is preferable. The reducing gas is not particularly limited but is preferably $H_2$. When $H_2$ is used as the reducing gas, $H_2$ as the constituent of the reducing atmosphere is preferably 0.1% by volume or more, and more preferably 2% by volume or more. When $H_2$ is 0.1% by volume or more, reduction can proceed efficiently.

Then, it is desirable that the thus obtained particles are further heat-treated at a temperature of 550° C. or more and 1,200° C. or less in the inert gas atmosphere as needed, in order to improve the crystallinity and to remove the adsorbed reducing gas. As the heat treatment conditions in the inert gas atmosphere, 550° C. or more is preferred. The composite tungsten compound starting material heat-treated at 550° C. or more exhibits sufficient conductivity. As the inert gas, it is preferable to use an inert gas such as Ar or $N_2$. The following heat treatment conditions are proposed for the production of a composite tungsten oxide having good crystallinity. However, the heat treatment conditions vary depending on the starting material and the type of the target compound, so the method is not limited to the following method.

In order to produce the composite tungsten oxide having good crystallinity, a higher heat treatment temperature is more preferable, and the reduction temperature varies depending on the starting material and the $H_2$ temperature at the time of reduction, but is preferably 600° C. to 850° C. Further, the subsequent heat treatment temperature in the inert atmosphere is preferably from 700° C. to 1,200° C.

The processing time for firing may be appropriately selected according to the temperature, but may be preferably 5 minutes or more and 5 hours or less. The thus obtained composite tungsten oxide fine particles along with an appropriate solvent are charged and wet-pulverized in a device selected from a bead mill, a ball mill, a sand mill, a paint shaker, an ultrasonic homogenizer, and the like to further micronize the composite tungsten oxide particles.

By this heat treatment, $2.2 \leq z/y \leq 3.0$ is satisfied in the composite tungsten oxide.

On the other hand, the method for producing the composite tungsten oxide is not limited to the solid phase reaction method. By setting appropriate production conditions, the composite tungsten oxide can also be produced by a thermal plasma method. Examples of the production conditions to be appropriately set include: a supply rate at the time of supplying the raw material into thermal plasma; a flow rate of a carrier gas used for supplying the raw material; a flow rate of a plasma gas for maintaining a plasma region; and a flow rate of a sheath gas flowing just outside the plasma region etc.

The heat treatment step for obtaining the composite tungsten oxide or the composite tungsten oxide particles described above may be referred to as the first step according to the present invention.

A bulk body or the particles of the composite tungsten oxide obtained in the above-described heat treatment step may be preferably micronized through the near-infrared absorbing material fine particle dispersion liquid, described later in "5. Near-infrared absorbing material fine particle dispersion liquid and method for production thereof". In the process of mixing the composite tungsten oxide particles with an appropriate solvent to obtain a near-infrared absorbing material fine particle dispersion liquid, the near-infrared absorbing material fine particle dispersion liquid is obtained while wet-pulverizing the mixture to proceed the micronization of the near-infrared absorbing material. In order to obtain the near-infrared absorbing material fine particles from the near-infrared absorbing material fine particle dispersion liquid, a solvent may be removed by a known method.

In addition, the bulk body or particles of the composite tungsten oxide can be micronized by a dry-micronization using a jet mill or the like. However, even in the case of the dry-micronization, it is needless to say that the pulverization conditions (micronization conditions) capable of imparting a predetermined particle size to the resulting composite tungsten oxide particles is to be set. For example, when a jet mill is used, a jet mill having an air volume and a processing time that satisfy appropriate pulverization conditions may be selected.

The step for obtaining the near-infrared absorbing material fine particles according to the present invention by micronizing the composite tungsten oxide or the composite tungsten oxide particles as described above may be referred to as the second step according to the present invention.

It is preferable to coat the surface of the near-infrared absorbing material fine particle which is the composite tungsten oxide fine particle obtained in the above-described second step with an oxide containing one or more kinds of metals selected from Si, Ti, Zr and Al, from a viewpoint of improving the weather resistance. The coating method is not particularly limited, but the surface of the near-infrared absorbing material fine particle can be coated by adding an alkoxide of the above-described metal into a solution in which the near-infrared absorbing material fine particles are dispersed.

5. Near-Infrared Absorbing Material Fine Particle Dispersion Liquid and Method for Production Thereof As described above, the near-infrared absorbing material fine particle dispersion liquid according to the present invention is obtained by mixing and dispersing the composite tungsten oxide fine particles obtained in the first step in an appropriate solvent. The solvent is not particularly limited and can be suitably selected according to coating and kneading conditions, coating and kneading environments, and further in the case of containing inorganic binder or resin binder, according to the binder. For example, water, and various organic solvents like alcohols such as ethanol, propanol, butanol, isopropyl alcohol, isobutyl alcohol, diacetone alcohol; ethers such as methyl ether, ethyl ether, propyl ether; esters; ketones such as acetone, methyl ethyl ketone, diethyl ketone, cyclohexanone, isobutyl ketone; aromatic hydrocarbons such as toluene or the like can be used.

Further, an acid or alkali may be added to the dispersion liquid to adjust pH, as desired.

Furthermore, a resin monomer or oligomer may be used as the solvent.

Needless to say, it is also possible to add various kinds of dispersants, surfactants, coupling agents and the like to further improve the dispersion stability of the above-described composite tungsten oxide fine particles in the dispersion liquid.

The dispersant, surfactant, and coupling agent can be selected according to the intended use, but are preferably those having an amine-containing group, a hydroxyl group, a carboxyl group, or an epoxy group as a functional group. These functional groups have effects of adsorbing on the surface of the surface-treated near-infrared absorbing material fine particles to prevent aggregation and uniformly dispersing the fine particles. A polymer dispersant having any of these functional groups in the molecule is more preferable.

As preferred specific examples of the commercially available dispersant, the following can be used: SOLSPERSE® 3000, 9000, 11200, 13000, 13240, 13650, 13940, 16000, 17000, 18000, 20000, 21000, 24000SC, 24000GR, 26000, 27000, 28000, 31845, 32000, 32500, 32550, 32600, 33000, 33500, 34750, 35100, 35200, 36600, 37500, 38500, 39000, 41000, 41090, 53095, 55000, 56000, 76500, and the like manufactured by Japan Lubrizol Co., Ltd.;

Disperbyk®-101, 103, 107, 108, 109, 110, 111, 112, 116, 130, 140, 142, 145, 154, 161, 162, 163, 164, 165, 166, 167, 168, 170, 171, 174, 180, 181, 182, 183, 184, 185, 190, 2000, 2001, 2020, 2025, 2050, 2070, 2095, 2150, 2155, Anti-Terra®-U, 203, 204, BYK®-P104, P104S, 220S, 6919, and the like manufactured by BYK Japan KK;

EFKA®-4008, 4046, 4047, 4015, 4020, 4050, 4055, 4060, 4080, 4300, 4330, 4400, 4401, 4402, 4403, 4500, 4510, 4530, 4550, 4560, 4585, 4800, 5220, 6230, manufactured by EFKA Additives B. V.; JONCRYL®-67, 678, 586, 611, 680, 682, 690, 819, JDX5050 and the like manufactured by BASF Japan;

TERPLUS® MD 1000, D 1180, D 1330 and the like manufactured by Otsuka Chemical Co., Ltd.;

DIANAL® BR-87, 116, and the like manufactured by Mitsubishi Chemical Corporation;

ARUFON® UC-3000, UF-5022, UG-4010, UG-4035, UG-4070, and the like, manufactured by Toagosei Co., Ltd.; and AJISPER® PB-711, PB-821, PB-822, and the like manufactured by Ajinomoto Fine-Techno Co., Ltd.

It is also beneficial to use a commercially available liquid or granular acrylic resin or methacrylic resin.

The near-infrared absorbing material fine particle dispersion liquid containing 80 parts by weight or more of solvent with respect to 100 parts by weight of the near-infrared absorbing material fine particles can easily ensure preserving property as a dispersion liquid and also ensure workability during the subsequent production of the near-infrared absorbing material fine particle dispersion.

The method for dispersing the composite tungsten oxide fine particles in the solvent is not particularly limited as long as it can uniformly disperse the fine particles in the dispersion liquid and prepare the composite tungsten oxide fine particles having the particle size of 800 nm or less, preferably 200 nm or less, and still more preferably 10 nm or more and 100 nm or less. Examples include a bead mill, a ball mill, a sand mill, a paint shaker, an ultrasonic homogenizer, and the like.

The mechanical dispersion treatment step using such a device facilitates dispersion of the composite tungsten oxide fine particles in the solvent and, at the same time, mutual collision of the composite tungsten oxide particles and the like can facilitate micronization, giving strain and deformation to the hexagonal crystal structure included in the composite tungsten oxide particles. Accordingly, an overlapping state of electron orbitals in the atoms constituting the crystal structure changes, so that the amount of the free electrons increases.

The rate of progress of micronization of the composite tungsten oxide particles varies depending on the device constant of the pulverizer. Therefore, it is important to carry out trial pulverization in advance to obtain a pulverizer and pulverization conditions capable of imparting a predetermined particle size to the composite tungsten oxide fine particle.

Even when the near-infrared absorbing material fine particles are micronized via the near-infrared absorbing material fine particle dispersion liquid and then the solvent is removed to obtain the dispersed powder of the near-infrared absorbing material fine particles, it is needless to say that pulverization conditions (micronization conditions) capable of imparting a predetermined particle size are to be set. Since the dispersed powder is a kind of the dried and solidified near-infrared absorbing fine particle dispersion liquid and contains the above-described dispersant, it can be re-dispersed in the solvent by being mixed with an appropriate solvent.

The state of the near-infrared absorbing material fine particle dispersion liquid according to the present invention can be confirmed by measuring the state of dispersion of the composite tungsten oxide fine particles when the composite tungsten oxide fine particles are dispersed in the solvent. For example, the composite tungsten oxide fine particles according to the present invention can be confirmed by sampling samples from a liquid in which they exist as fine particles and aggregated fine particles in the solvent, and performing measurement using various commercially available particle size distribution meters. As the particle size distribution meter, for example, a known measuring device such as ELS-8000 manufactured by Otsuka Electronics Co., Ltd. based on the dynamic light scattering method can be used.

In addition, as for the crystal structure of the composite tungsten oxide fine particles, X-ray diffraction measurement is performed on the composite tungsten oxide fine particles obtained by removing the solvent from the near-infrared absorbing material fine particle dispersion liquid to specify the crystal structure included in the fine particles.

From a viewpoint of exhibiting excellent near-infrared absorption property, the crystallite size of the near-infrared absorbing fine particles is preferably 1 nm or more and 200 nm or less, more preferably 1 nm or more and 100 nm or less, and still more preferably 10 nm or more and 70 nm or less. The measurement of the crystallite size uses measurement of the X-ray diffraction pattern by the powder X-ray diffraction method ($\theta$-$2\theta$ method) and analysis by the Rietveld method. A measurement of the X-ray diffraction pattern can be performed using a powder X-ray diffraction apparatus (X'Pert-PRO/MPD manufactured by Spectris Corporation, PANalytical) or the like.

It is preferred that the dispersed particle size of the composite tungsten oxide fine particle is sufficiently fine, preferably 200 nm or less, more preferably 100 nm or less, from the viewpoint of the optical properties. Further, it is preferred that the composite tungsten oxide fine particles are uniformly dispersed.

The reason is as follows. When the dispersed particle size of the composite tungsten oxide fine particle is preferably 200 nm or less, more preferably 10 nm or more and 200 nm or less, and still more preferably 10 nm or more and 100 nm or less, it is possible to avoid the produced near-infrared absorber from becoming a grayish matter which has monotonously decreased transmittance.

The dispersed particle size of the near-infrared absorbing material fine particle dispersion according to the present invention is a concept indicating a particle size of a simple particle of the composite tungsten oxide fine particles and of an aggregated particle of the composite tungsten oxide fine particles, each particle being dispersed in the near-infrared absorbing material fine particle dispersion or near-infrared absorber.

The dispersed particle size of the composite tungsten oxide fine particle, which is the near-infrared absorbing material fine particle, in the near-infrared absorbing material fine particle dispersion according to the present invention can be obtained by measuring the particle sizes of 100 composite tungsten oxide fine particles using an image processing device and calculating the average value thereof, from a transmission electron microscope image of thinned samples taken out of the near infrared absorbing material fine particle dispersion by cross-section processing.

A microtome, a cross section polisher, a focused ion beam (FIB) apparatus, or the like can be used for cross-section processing for taking out the thinned samples. The dispersed particle size of the composite tungsten oxide fine particle contained in the near-infrared absorbing material fine particle dispersion or near-infrared absorber is the average value of the dispersed particle sizes of the composite tungsten oxide fine particles which are the near-infrared absorbing material fine particles dispersed in a solid medium which is a matrix.

On the other hand, in the near-infrared absorbing material fine particle dispersion liquid, the composite tungsten oxide fine particles aggregate into coarse aggregates. When a large number of the coarsened particles exist, such coarse particles become a light scattering source. As a result, when the near-infrared absorbing material fine particle dispersion liquid is formed into the near-infrared absorbing layer or the near-infrared absorber, the cloudiness (haze) becomes higher, which may cause a decrease in visible light transmittance. Therefore, it is preferable to avoid the formation of coarse particles of the composite tungsten oxide fine particles.

In order to obtain the near-infrared absorbing material fine particles from the resulting near-infrared absorbing material fine particle dispersion liquid, the solvent may be removed by a known method. However, the near-infrared absorbing material fine particle dispersion liquid is preferably dried under reduced pressure. Specifically, the near-infrared absorbing material fine particle dispersion liquid may be dried under reduced pressure while stirring to separate the solvent component. The pressure value is appropriately selected at the time when the pressure is reduced in the drying step.

When the drying-under-reduced-pressure method is used, the efficiency of removing the solvent from the near-infrared absorbing material fine particle dispersion liquid is improved, and the near-infrared absorbing material fine particle dispersed powders according to the present invention are not exposed to high temperature for a long time.

Accordingly, aggregation of the near-infrared absorbing material fine particles dispersed in the dispersed powders does not occur, which is preferable. Furthermore, the productivity of the near-infrared absorbing material fine particles is enhanced, and the evaporated solvent can be easily recovered, which is preferable from the viewpoint of environmental consideration.

As equipment used in the drying process, those including, but not limited to, vacuum flow dryers, vacuum heating and stirring crushers, vibration flow dryers, drum dryers, and the like are preferred from the viewpoint that heating and reducing pressure are possible and the dispersed powder can be easily mixed and recovered.

6. Near-Infrared Absorbing Material Fine Particle Dispersion and Method for Production Thereof The near-infrared absorbing material fine particle dispersion according to the present invention includes the above-described near-infrared absorbing material fine particles, the above-described silane compound, and an acrylic resin.

When 80 parts by mass or more of the acrylic resin is contained as the solid medium with respect to 100 parts by mass of the near-infrared absorbing material fine particles, the near-infrared absorbing material fine particle dispersion can be preferably formed.

When the near-infrared absorbing material fine particles is mixed and melt-kneaded with the acrylic resin as the solid medium, the silane compound described in "2. Silane compound" is added.

The addition amount of the silane compound is preferably 1 part by mass or more and 200 parts by mass or less with respect to 100 parts by mass of the near-infrared absorbing material fine particles.

The near-infrared absorbing material fine particle dispersion according to the present invention is obtained by melt-kneading the near-infrared absorbing material fine particles into the solid medium containing the silane compound.

It is also preferable to produce the near-infrared absorbing material fine particle dispersion in the form of a masterbatch by adding an appropriate amount of a part of the solid medium to be added, rather than a whole of the solid medium to be added, in the near-infrared absorbing material fine particle dispersion according to the present invention.

When the near-infrared absorbing material fine particle dispersion according to the present invention is produced in the form of a masterbatch, a mixture of the solid medium containing the silane compound and the near-infrared absorbing material fine particles is kneaded in a bent-type single-screw or twin-screw extruder, and processed into pellets to provide the infrared absorbing material fine particle dispersion according to the present invention in the form of a masterbatch.

The masterbatch pellets can be obtained by the most common method for cutting melt-extruded strands. Accordingly, examples of their shape include a cylinder and a prism. Further, a so-called hot cut method can be employed which directly cuts the melt-extrudate. In such a case, the pellet generally takes a shape close to a sphere.

As described above, the masterbatch according to the present invention can take any form or shape. However, the masterbatch pellet preferably has the same form and shape as those of the solid medium used for dilution when the near-infrared absorber described later is molded.

Since the composite tungsten oxide fine particles maintain a dispersed state in the near-infrared absorbing material fine particle dispersion according to the present invention, the near-infrared absorbing material fine particle dispersion has the advantage of being applicable to a base material having a low heatproof temperature such as a resinous material, and inexpensive without requiring large-scale equipment in the formation of the near-infrared absorber.

In some cases, the average particle size of the composite tungsten oxide fine particle dispersed in the matrix of the solid medium of the near-infrared absorbing material fine particle dispersion may be different from the dispersed particle size of the composite tungsten oxide fine particle dispersed in the near-infrared absorbing material fine particle dispersion liquid used for forming the near-infrared absorbing material fine particle dispersion or in the dispersion liquid for forming the near-infrared absorber. This is because aggregation of the composite tungsten oxide fine particles which aggregate in the dispersion liquid is resolved when the near-infrared absorbing material fine particle dispersion is obtained from the near-infrared absorbing material fine particle dispersion liquid or the dispersion liquid for forming the near-infrared absorber.

7. Near-Infrared Absorber and Method for Production Thereof

The near-infrared absorbing material fine particle dispersion according to the present invention is molded into any one shape selected from a plate, a film, and a thin film to obtain the near-infrared absorber according to the present invention. When the near-infrared absorbing material fine particle dispersion according to the present invention is in the form of a masterbatch, the near-infrared absorbing material fine particle dispersion is mixed with a predetermined amount of the acrylic resin medium which is the solid medium according to a known method, and thereafter molded into any one shape selected from a plate shape, a film shape, and a thin film shape, according to a known method.

The near-infrared absorber according to the present invention more efficiently absorbs solar radiation, especially light in the near-infrared region, compared to the near-infrared absorber according to the conventional art, and at the same time exhibits excellent optical property of maintaining high transmittance in the visible light region. Then the absorbed near-infrared radiations are converted into heat.

The near-infrared absorbing material fine particle dispersion according to the present invention can be used to obtain the near-infrared absorber having excellent near-infrared absorption property.

The term near-infrared absorption property used in the present invention is a concept indicating that light of a wavelength from 780 nm to 1,200 nm in the near-infrared region is well absorbed.

The solar radiation includes various wavelengths, and can be roughly classified into ultraviolet, visible, and infrared radiations. Among them, infrared radiation is known to account for about 46%. The near-infrared absorbing material fine particles according to the present invention greatly absorb light in the near infrared region, particularly in the vicinity of a wavelength of 1,000 nm.

Therefore, the near-infrared absorption property can be evaluated by the transmittance of the solar radiation, that is, the solar transmittance. When the solar transmittance is low, light in the near-infrared region is well-absorbed, so that it can be determined that the near-infrared absorption property is excellent.

As a result, for example, when the near-infrared absorber according to the present invention is formed into a film, and attached to a window, the penetration of solar heat into the room can be controlled while maintaining the brightness of the room.

The method has been explained in which a masterbatch of the near-infrared absorbing material fine particle dispersion according to the present invention is mixed with a predetermined amount of the acrylic resin medium which is the solid medium according to a known method, and molded into any one shape selected from a plate shape, a film shape, and a thin film shape, according to a known method. However, the near-infrared absorbing material fine particles according to the present invention can be dispersed in the solid medium which is a base material, not via a masterbatch.

In order to disperse the near-infrared absorbing material fine particles in the solid medium, they may be penetrated from the surface of the solid medium along with 1 part by mass or more and 200 parts by mass or less of the silane compound with respect to the 100 parts by mass of the near-infrared absorbing material fine particles. It is also preferable that the acrylic resin which is the solid medium is melted while the temperature is raised to a temperature equal to or higher than a melting temperature thereof, and then 100 parts by mass of the near-infrared absorbing material fine particles are mixed with 1 part by mass or more and 200 parts by mass or less of the silane compound and the acrylic resin medium. The resultant can be formed into a film or a plate (board) by a predetermined method to obtain a near-infrared absorber.

As a method for dispersing the near-infrared absorbing material fine particles in the acrylic resin medium, first, the acrylic resin, the near-infrared absorbing material fine particle dispersion liquid, and 1 part by mass or more and 200 parts by mass or less of the silane compound with respect to 100 parts by mass of the near-infrared absorbing material fine particles are mixed to obtain a mixture. It is also possible to prepare the near-infrared absorber by evaporating the dispersion solvent from the resulting mixture, then heating it to about 260° C., which is a melting temperature of the acrylic acid, to melt the acrylic resin, and mixing and cooling the mixture.

8. Near-Infrared Absorber Laminate and Method for Production Thereof

In the near-infrared absorber laminate according to the present invention, the near-infrared absorber is laminated on a surface of a predetermined base material.

The near-infrared absorber laminate according to the present invention can be produced by forming the near-infrared absorber on the surface of a predetermined base material.

The base material for the near-infrared absorber laminate may be either a film or a board, as desired, and the shape is not limited. For the material of the transparent base material, PET, acrylic, urethane, polycarbonate, polyethylene, ethylene—vinyl acetate copolymer, vinyl chloride, fluorine resin, or the like can be used depending on the purposes. Besides resin, glass may be used.

9. Laminated Structure for Near-Infrared Absorption and Method for Production Thereof In one of the laminated structures for near-infrared absorption according to the present invention, the near-infrared absorber molded using the near-infrared absorbing material fine particle dispersion according to the present invention is present between two or more laminated plates selected from sheet glass, plastic plate, and plastic plate containing fine particles having near-infrared absorption function.

In one of the laminated structures for near-infrared absorption according to the present invention, the near-infrared absorber laminate is opposed to a laminated plate selected from sheet glass, plastic plate, and plastic plate containing fine particles having near-infrared absorption function, or is present between two or more laminated plates selected from sheet glass, plastic plate, and plastic plate containing fine particles having near-infrared absorption function.

The transparent near-infrared absorbing laminate base material using the near-infrared absorber according to the present invention may be in a variety of forms.

For example, a near-infrared absorbing laminated inorganic glass using an inorganic glass as a transparent base material is obtained by attaching and integrating a plurality of opposing inorganic glass sheets with near-infrared absorbers being sandwiched therebetween, by a known method. The obtained near-infrared absorbing laminated inorganic glass can be used as building materials such as roofing materials for carports, stadiums, shopping malls, and airports, window materials, and the like. In addition, it can also be used for car windows (roof windows, quarter windows) and car windshields.

The above-described near-infrared absorber or near-infrared absorber laminate according to the present invention can be sandwiched between two or more opposing transparent base materials, or the near-infrared absorber laminate according to the present invention can be opposed to the transparent base material, to produce the laminated structure for near-infrared absorption according to the present invention.

When a transparent resin is used as the transparent base material, similarly to the case using the above-described inorganic glass, the near-infrared absorbing layer according to the present invention can be sandwiched between two or more opposing transparent base materials selected from sheet glass, plastic, and plastic containing fine particles having near-infrared absorption function, or the near-infrared absorber laminate according to the present invention can be opposed to the transparent base material, to produce the transparent near-infrared absorbing laminated base material. The intended use is similar to that of the near-infrared absorbing laminated inorganic glass.

Further, a near-infrared absorbing layer can be used alone depending on the intended use. Of course, the transparent base material such as inorganic glass or transparent resin with the near-infrared absorbing layer existing on either or both sides thereof can also be used as a near-infrared absorber laminate.

10. Summary

The infrared absorbing material fine particle dispersion, the near-infrared absorber, the near-infrared absorber laminate, and the laminated structure for near-infrared absorption according to the present invention more efficiently absorb solar radiation, especially light in the near-infrared region, compared to the near-infrared absorbing material fine particle dispersions, near-infrared absorbers, and laminated structures for near-infrared absorption according to the conventional art, while exhibiting excellent optical properties, for example, maintaining high transmittance in the visible light region.

The near-infrared absorbing layer produced by film formation on the base material using the near-infrared absorbing material fine particle dispersion according to the present invention, in which the near-infrared absorbing material fine particles are dispersed in the acrylic resin, more efficiently absorbs solar radiation, particularly light in the near-infrared region, compared to a layer produced by a dry method like a vacuum deposition method such as a sputtering method, a vapor deposition method, an ion plating method, and a chemical vapor deposition method (CVD method), while exhibiting excellent optical properties, for example, maintaining high transmittance in the visible light region.

Further, the near-infrared absorber, near-infrared absorber laminate, and laminated structure for near-infrared absorption according to the present invention can be inexpensively produced without using large-scale equipment such as vacuum equipment, and are industrially useful.

EXAMPLE

The present invention will be specifically described, with reference to examples. However, the present invention is not limited thereto.

In the measurement of the crystallite size of the composite tungsten oxide fine particles according to the present invention, the composite tungsten oxide fine particle dispersed powders obtained after removal of the solvent from the near-infrared absorbing material fine particle dispersion liquid were used. Then an X-ray diffraction pattern of the composite tungsten oxide fine particles was measured by a powder X-ray diffraction method (θ-2θ method) using a powder X-ray diffraction apparatus (X'Pert-PRO/MPD manufactured by Spectris Corporation, PANalytical). The size of the crystallite contained in the fine particle was measured from the resulting X-ray diffraction pattern and analysis by the Rietveld method.

The dispersed particle size of the composite tungsten oxide fine particle in the near-infrared absorbing material fine particle dispersion according to the present invention was measured from the image (×20,000) of the thinned sample of the near-infrared absorbing material fine particle dispersion by a transmission electron microscope (HF-2200 manufactured by Hitachi, Ltd.) using an image analysis.

Further, visible light transmittance and solar transmittance of the near-infrared absorbing acrylic resin molded article containing Cs tungsten oxide fine particles were measured based on JIS R 3106:1988 using a spectrophotometer U-4100 manufactured by Hitachi, Ltd. The haze value was measured using HM-150W manufactured by Murakami Color Research Laboratory based on JIS K 7136:2000.

Example 1

In 6.70 kg of water, 7.43 kg of cesium carbonate ($Cs_2CO_3$) was dissolved to obtain a solution. The solution was added to 34.57 kg of tungstic acid ($H_2WO_4$) and sufficiently stirred and mixed, and thereafter dried while stirring to obtain a dried product (the molar ratio between W and Cs is equivalent to 1:0.33). The dried product was heated while supplying 5% by volume of $H_2$ gas using $N_2$ gas as a carrier, and fired at a temperature of 800° C. for 5.5 hours, and thereafter, the supply gas was switched to $N_2$ gas only, and the temperature was lowered to room temperature to obtain the Cs tungsten oxide fine particles a.

15% by mass of the Cs tungsten oxide fine particles a, 12% by mass of an acrylic polymer dispersant having an amine-containing group as a functional group (an acrylic dispersant having an amine value of 48 mg KOH/g and a decomposition temperature of 250° C.) (referred to as "dispersant a" hereafter), and 73% by mass of toluene were weighed, 60 g in total. The weighed substance was charged into a paint shaker (manufactured by Asada Iron Works Co., Ltd.) containing 240 g of 0.3 mmΦ $ZrO_2$ beads, and thereafter subjected to pulverization/dispersion treatment for 24 hours to prepare a near-infrared absorbing material fine particle dispersion liquid in toluene (A-1 liquid).

The dispersed particle size of the near-infrared absorbing material fine particle (Cs tungsten oxide fine particle a) in A-1 liquid was 72.4 nm.

The crystallite size of the Cs tungsten oxide fine particle a in the dispersed powder after removal of the solvent from A-1 liquid was 25 nm.

Further, 20 g of dispersant a was added to A-1 liquid to obtain the near-infrared absorbing material fine particle dispersion liquid in toluene (A-2 liquid).

The solvent was removed from A-2 liquid with a vacuum heating and stirring crusher (manufactured by ISHIKAWA KOJO Co., Ltd.) to obtain Cs tungsten oxide fine particle dispersed powders b. 1.6% by mass of the resulting Cs tungsten oxide fine particle dispersed powder b (as Cs tungsten oxide fine particles $Cs_{0.33}WO_3$), 0.32% by mass of an alkoxysilane compound (KBM-103, manufactured by Shin-Etsu Silicones), and the balance of a methacrylic resin were mixed, uniformly mixed using a blender, and melt-kneaded at 260° C. using a twin-screw extruder, and the extruded strand was cut into pellets to obtain a masterbatch for the near-infrared absorber. The dispersed particle size in the near-infrared absorber was measured from the thinned sample of the masterbatch.

0.045% by mass of the resulting master batch (as Cs tungsten oxide fine particles $Cs_{0.33}WO_3$) was mixed with the balance of methacrylic resin to obtain a mixture. The resulting mixture was charged into an injection molding die and molded into a plate having a thickness of 1 mm at 250° C. to a obtain the near-infrared absorber e according to Example 1, in which the Cs tungsten oxide particles were uniformly dispersed throughout the acrylic resin.

The compositions of the near-infrared absorbing material fine particles in the near-infrared absorber according to Example 1, and the silane compound and acrylic resins in the near-infrared absorbing material fine particles, the dispersed particle size of the near-infrared absorbing material fine particle, and the thickness of the plate of the near-infrared absorber are listed in Table 1.

The optical properties of the resulting near-infrared absorber e according to Example 1 were measured. As illustrated in Table 1, when the visible light transmittance was 81.6%, the solar transmittance was 51.6% and the haze value was 1.1%.

The results of the measurements of the optical properties of the near-infrared absorber e according to Example 1 are listed in Table 1.

Example 2

In the same manner as in Example 1, except that the resulting mixture was charged into an injection molding die and molded into a plate having a thickness of 2 mm at 250° C., the near-infrared absorber f according to Example 2 was obtained.

The composition of the near-infrared absorbing material fine particles in the near-infrared absorber according to Example 2, the silane compound and acrylic resins in the near-infrared absorbing material fine particles, the dispersed particle size of the near-infrared absorbing material fine particle, and the thickness of the plate of the near-infrared absorber are listed in Table 1. Hereinafter, Table 1 indicates similarly for Examples 3 to 24 and Comparative Examples 1 to 4.

The optical properties of the resulting near-infrared absorber f according to Example 2 were measured. As illustrated in Table 1, when the visible light transmittance was 74.2%, the solar transmittance was 39.2% and the haze value was 1.7%.

The results of the measurements of the optical properties of the near-infrared absorber f according to Example 2 are listed in Table 1.

Hereinafter, for Examples 3 to 16, the compositions of the near-infrared absorbing material fine particles in the near-infrared absorber, and the silane compound and acrylic resins in the near-infrared absorber, the dispersed particle size of the near-infrared absorbing material fine particle, and the thickness of the plate of the near-infrared absorber are listed in Table 1; and for Examples 17 to 24, and Comparative Examples 1 to 4, the compositions of the near-infrared absorbing material fine particles in the near-infrared absorber, and the silane compound and acrylic resins in the near-infrared absorber, the dispersed particle size of the near-infrared absorbing material fine particle, and the thickness of the plate and optical properties of the near-infrared absorber are listed in Table 2.

Example 3

In the same manner as in Example 1, except that 0.094% by mass of the resulting master batch (as Cs tungsten oxide fine particles $Cs_{0.33}WO_3$) was mixed with the balance of methacrylic resin, the near-infrared absorber g was obtained.

The optical properties of the resulting near-infrared absorber g according to Example 3 were measured. As illustrated in Table 1, when the visible light transmittance was 71.2%, the solar transmittance was 35.1% and the haze value was 1.8%.

Example 4

In the same manner as in Example 3, except that the resulting mixture was charged into an injection molding die and molded into a plate having a thickness of 2 mm at 250° C., the near-infrared absorber h according to Example 4 was obtained.

The optical properties of the resulting near-infrared absorber h according to Example 4 were measured. As illustrated in Table 1, when the visible light transmittance was 58.4%, the solar transmittance was 24.6% and the haze value was 2.7%.

Example 5

1.6% by mass of the resulting Cs tungsten oxide fine particle dispersed powder b (as Cs tungsten oxide fine particles $Cs_{0.33}WO_3$), 0.32% by mass of silicone resin (217 FLAKE; manufactured by Dow Toray Co., Ltd.), and the balance of methacrylic acid were mixed to obtain a mixture. In the same manner as in Example 1, except that the resulting mixture was uniformly mixed using a blender, and thereafter melt-kneaded at 260° C. using a twin-screw extruder, and the extruded strand was cut into pellets to obtain a masterbatch for the near-infrared absorber, the near-infrared absorber i according to Example 5 was obtained.

The optical properties of the resulting near-infrared absorber i according to Example 5 were measured. As illustrated in Table 1, when the visible light transmittance was 80.0%, the solar transmittance was 49.1% and the haze value was 1.7%.

Example 6

In the same manner as in Example 5, except that the resulting mixture was charged into an injection molding die and molded into a plate having a thickness of 2 mm at 250° C., the near-infrared absorber j according to Example 6 was obtained.

The optical properties of the resulting near-infrared absorber j according to Example 6 were measured. As illustrated in Table 1, when the visible light transmittance was 71.7%, the solar transmittance was 36.7% and the haze value was 2.6%.

Example 7

In the same manner as in Example 5, except that 0.094% by mass of the resulting master batch (as Cs tungsten oxide fine particles $Cs_{0.33}WO_3$) was mixed with the balance of methacrylic resin, the near-infrared absorber k was obtained.

The optical properties of the resulting near-infrared absorber k according to Example 7 were measured. As illustrated in Table 1, when the visible light transmittance was 69.5%, the solar transmittance was 33.9% and the haze value was 2.8%.

Example 8

In the same manner as in Example 7, except that the resulting mixture was charged into an injection molding die and molded into a plate having a thickness of 2 mm at 250° C., the near-infrared absorber l was obtained.

The optical properties of the resulting near-infrared absorber l according to Example 8 were measured. As illustrated in Table 1, when the visible light transmittance was 56.2%, the solar transmittance was 23.4% and the haze value was 4.1%.

Example 9

1.6% by mass of the resulting Cs tungsten oxide fine particle dispersed powder b (as Cs tungsten oxide fine particles $Cs_{0.33}WO_3$), 0.32% by mass of the silane coupling agent (KBM-903, manufactured by Shin-Etsu Silicones), and the balance of methacrylic resin were mixed to obtain a mixture. In the same manner as in Example 1, except that the resulting mixture was uniformly mixed using a blender, and thereafter melt-kneaded at 260° C. using a twin-screw extruder, and the extruded strand was cut into pellets to obtain a masterbatch for the near-infrared absorber, the near-infrared absorber m according to Example 9 was obtained.

The optical properties of the resulting near-infrared absorber m according to Example 9 were measured. As illustrated in Table 1, when the visible light transmittance was 81.2%, the solar transmittance was 50.9% and the haze value was 2.0%.

Example 10

In the same manner as in Example 9, except that the resulting mixture was charged into an injection molding die and molded into a plate having a thickness of 2 mm at 250° C., the near-infrared absorber n according to Example 10 was obtained.

The optical properties of the resulting near-infrared absorber n according to Example 10 were measured. As illustrated in Table 1, when the visible light transmittance was 70.5%, the solar transmittance was 35.5% and the haze value was 3.0%.

Example 11

In the same manner as in Example 9, except that 0.094% by mass of the resulting master batch (as Cs tungsten oxide fine particles $Cs_{0.33}WO_3$) was mixed with the balance of methacrylic resin, the near-infrared absorber o was obtained.

The optical properties of the resulting near-infrared absorber o according to Example 11 were measured. As illustrated in Table 1, when the visible light transmittance was 69.1%, the solar transmittance was 33.3% and the haze value was 3.3%.

Example 12

In the same manner as in Example 11, except that the resulting mixture was charged into an injection molding die and molded into a plate having a thickness of 2 mm at 250° C., the near-infrared absorber p was obtained.

The optical properties of the resulting near-infrared absorber p according to Example 12 were measured. As illustrated in Table 1, when the visible light transmittance was 55.4%, the solar transmittance was 22.5% and the haze value was 4.9%.

Example 13

1.6% by mass of the resulting Cs tungsten oxide fine particle dispersed powder b (as Cs tungsten oxide fine particles $Cs_{0.33}WO_3$), 0.32% by mass of the silane coupling agent (KBM-5103, manufactured by Shin-Etsu Silicones), and the balance of methacrylic resin were mixed to obtain a mixture. In the same manner as in Example 1, except that the resulting mixture was uniformly mixed using a blender, and thereafter melt-kneaded at 260° C. using a twin-screw extruder, and the extruded strand was cut into pellets to obtain a masterbatch for the near-infrared absorber, the near-infrared absorber q according to Example 13 was obtained.

The optical properties of the resulting near-infrared absorber q according to Example 13 were measured. As illustrated in Table 1, when the visible light transmittance was 80.9%, the solar transmittance was 51.3% and the haze value was 1.8%.

Example 14

In the same manner as in Example 13, except that the resulting mixture was charged into an injection molding die and molded into a plate having a thickness of 2 mm at 250° C., the near-infrared absorber r according to Example 14 was obtained.

The optical properties of the resulting near-infrared absorber r according to Example 14 were measured. As illustrated in Table 1, when the visible light transmittance was 72.0%, the solar transmittance was 37.4% and the haze value was 2.8%.

Example 15

In the same manner as in Example 13, except that 0.094% by mass of the resulting master batch (as Cs tungsten oxide fine particles $Cs_{0.33}WO_3$) was mixed with the balance of methacrylic resin, the near-infrared absorber s was obtained.

The optical properties of the resulting near-infrared absorber s according to Example 15 were measured. As illustrated in Table 1, when the visible light transmittance was 69.2%, the solar transmittance was 33.2% and the haze value was 3.1%.

Example 16

In the same manner as in Example 15, except that the resulting mixture was charged into an injection molding die and molded into a plate having a thickness of 2 mm at 250° C., the near-infrared absorber t was obtained.

The optical properties of the resulting near-infrared absorber t according to Example 16 were measured. As illustrated in Table 1, when the visible light transmittance was 55.8%, the solar transmittance was 23.1% and the haze value was 4.6%.

Example 17

1.6% by mass of the resulting Cs tungsten oxide fine particle dispersed powder b (as Cs tungsten oxide fine particles $Cs_{0.33}WO_3$), 0.32% by mass of the alkoxysilane (KBM-3063, manufactured by Shin-Etsu Silicones), and the balance of methacrylic resin were mixed to obtain a mixture. In the same manner as in Example 1, except that the resulting mixture was uniformly mixed using a blender, and thereafter melt-kneaded at 260° C. using a twin-screw extruder, and the extruded strand was cut into pellets to obtain a masterbatch for the near-infrared absorber, the near-infrared absorber u according to Example 17 was obtained.

The optical properties of the resulting near-infrared absorber u according to Example 17 were measured. As illustrated in Table 2, when the visible light transmittance was 80.5%, the solar transmittance was 50.1% and the haze value was 1.8%.

Example 18

In the same manner as in Example 17, except that the resulting mixture was charged into an injection molding die and molded into a plate having a thickness of 2 mm at 250° C., the near-infrared absorber v according to Example 18 was obtained.

The optical properties of the resulting near-infrared absorber v according to Example 18 were measured. As illustrated in Table 2, when the visible light transmittance was 70.9%, the solar transmittance was 35.5% and the haze value was 2.9%.

Example 19

In the same manner as in Example 17, except that 0.094% by mass of the resulting master batch (as Cs tungsten oxide fine particles $Cs_{0.33}WO_3$) was mixed with the balance of methacrylic resin, the near-infrared absorber w was obtained.

The optical properties of the resulting near-infrared absorber w according to Example 19 were measured. As illustrated in Table 2, when the visible light transmittance was 69.0%, the solar transmittance was 33.4% and the haze value was 3.1%.

Example 20

In the same manner as in Example 19, except that the resulting mixture was charged into an injection molding die and molded into a plate having a thickness of 2 mm at 250° C., the near-infrared absorber x was obtained.

The optical properties of the resulting near-infrared absorber x according to Example 20 were measured. As illustrated in Table 2, when the visible light transmittance was 55.2%, the solar transmittance was 22.5% and the haze value was 4.7%.

Example 21

1.6% by mass of the resulting Cs tungsten oxide fine particle dispersed powder b (as Cs tungsten oxide fine particles $Cs_{0.33}WO_3$), 0.32% by mass of the alkoxysilane (KBM-7053, manufactured by Shin-Etsu Silicones), and the balance of methacrylic resin were mixed to obtain a mixture. In the same manner as in Example 1, except that the resulting mixture was uniformly mixed using a blender, and thereafter melt-kneaded at 260° C. using a twin-screw extruder, and the extruded strand was cut into pellets to obtain a masterbatch for the near-infrared absorber, the near-infrared absorber y according to Example 21 was obtained.

The optical properties of the resulting near-infrared absorber y according to Example 21 were measured. As illustrated in Table 2, when the visible light transmittance was 81.2%, the solar transmittance was 51.1% and the haze value was 1.8%.

Example 22

In the same manner as in Example 21, except that the resulting mixture was charged into an injection molding die and molded into a plate having a thickness of 2 mm at 250° C., the near-infrared absorber z according to Example 22 was obtained.

The optical properties of the resulting near-infrared absorber z according to Example 22 were measured. As illustrated in Table 2, when the visible light transmittance was 72.5%, the solar transmittance was 36.5% and the haze value was 2.8%.

Example 23

In the same manner as in Example 21, except that 0.094% by mass of the resulting masterbatch (as Cs tungsten oxide fine particles $Cs_{0.33}WO_3$) was mixed with the balance of methacrylic resin, the near-infrared absorber a was obtained.

The optical properties of the resulting near-infrared absorber a according to Example 23 were measured. As illustrated in Table 2, when the visible light transmittance was 70.3%, the solar transmittance was 34.4% and the haze value was 3.0%.

Example 24

In the same manner as in Example 23, except that the resulting mixture was charged into an injection molding die and molded into a plate having a thickness of 2 mm at 250° C., the near-infrared absorber β was obtained.

The optical properties of the resulting near-infrared absorber β according to Example 24 were measured. As illustrated in Table 2, when the visible light transmittance was 56.3%, the solar transmittance was 23.5% and the haze value was 4.4%.

Comparative Example 1

In the same manner as in Example 1, except that the alkoxysilane compound was not added during melt-kneading at 260° C. using a twin-screw extruder, the near-infrared absorber γ according to Comparative Example 1 was obtained.

The optical properties of the resulting near-infrared absorber γ were measured. As illustrated in Table 2, when the visible light transmittance was 80.4%, the solar transmittance was 51.2% and the haze value was 2.1%.

Comparative Example 2

In the same manner as in Comparative Example 1, except that the resulting mixture was charged into an injection molding die and molded into a plate having a thickness of 2 mm at 250° C., the near-infrared absorber δ was obtained.

The optical properties of the resulting near-infrared absorber δ were measured. As illustrated in Table 2, when the visible light transmittance was 71.4%, the solar transmittance was 37.4% and the haze value was 3.3%.

Comparative Example 3

In the same manner as in Comparative Example 1, except that 0.094% by mass of the resulting master batch (as Cs tungsten oxide fine particles $Cs_{0.33}WO_3$) was mixed with the methacrylic resin, the near-infrared absorber c was obtained.

The optical properties of the resulting near-infrared absorber c were measured. As illustrated in Table 2, when the visible light transmittance was 68.5%, the solar transmittance was 33.5% and the haze value was 3.7%.

Comparative Example 4

In the same manner as in Comparative Example 3, except that the resulting mixture was charged into an injection molding die and molded into a plate having a thickness of 2 mm at 250° C., the near-infrared absorber was obtained.

The optical properties of the resulting near-infrared absorber were measured. As illustrated in Table 2, when the visible light transmittance was 54.0%, the solar transmittance was 22.1% and the haze value was 5.7%.

SUMMARY

Based on the results of Examples and Comparative Examples described above, comparisons were made between the optical properties of the near-infrared absorbers according to Examples 1 to 4, 17 to 24 to which an alkoxysilane compound (KBM-103, KBM-3063, KBM-7103; manufactured by Shin-Etsu Silicones) was added, the near-infrared absorbers according to Examples 5 to 8 to which a silicone resin (217FLAKE; manufactured by Dow Toray Co., Ltd.) was added, and the near-infrared absorbers according to Examples 9 to 16 to which a silane coupling agent (KBM-903, KBM-5103; manufactured by Shin-Etsu Silicones) was added, and the near-infrared absorbers according to Comparative Examples 1 to 4 to which the silane compound was not added.

Figure 1:
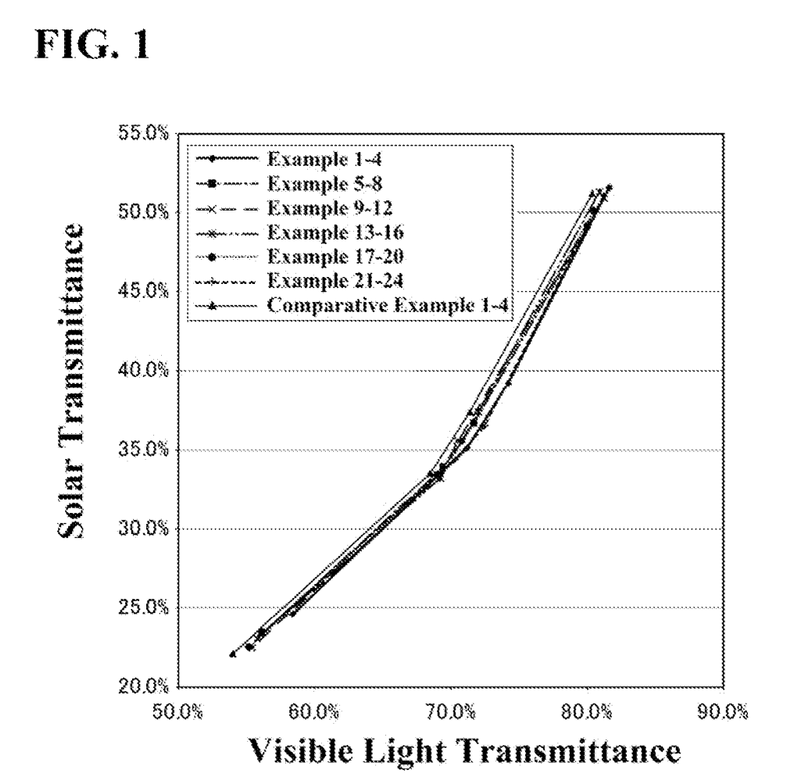
FIG. 1 is a graph of the visible light transmittance and the solar transmittance in the near-infrared absorbing material fine particle dispersion.
Figure 2:
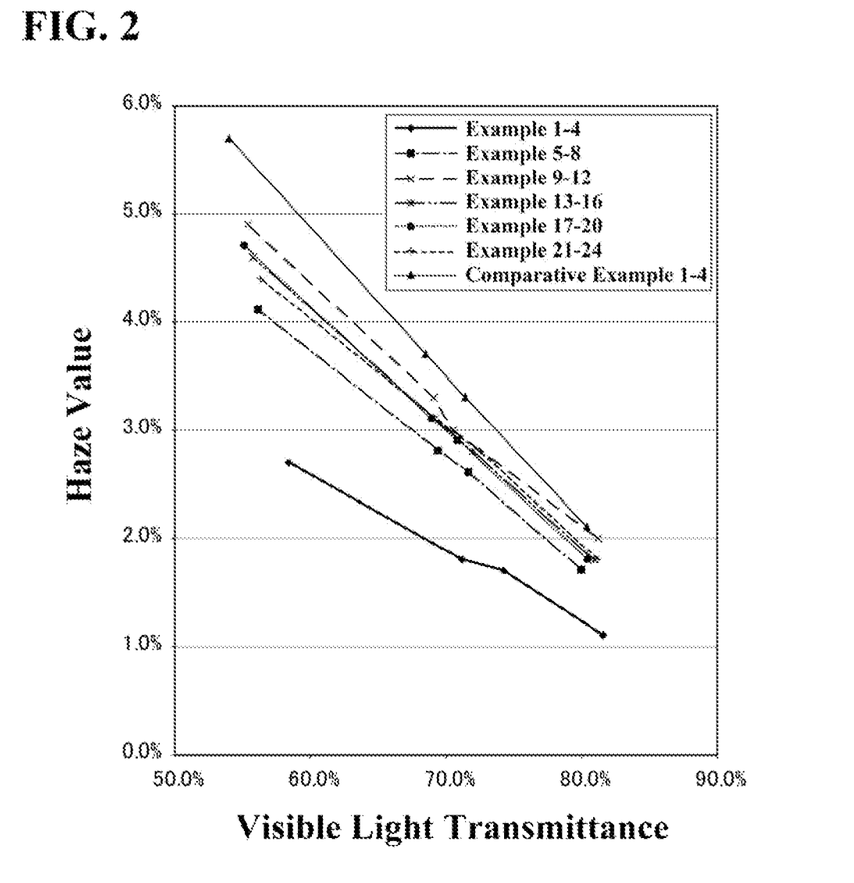
FIG. 2 is a graph of the visible light transmittance and the haze value in the near-infrared absorbing material fine particle dispersion.

For the convenience for the comparisons of the optical properties, FIG. 1 is prepared, in which the vertical axis represents the solar transmittance and the horizontal axis represents the visible light transmittance, Examples 1 to 4 are plotted with ♦ connected by thick solid lines, Examples 5 to 8 are plotted with ■ connected by dash-dot-dash lines, Examples 9 to 12 are plotted with × connected by long broken lines, Examples 13 to 16 are plotted with * connected by dash-dot-dot-dash lines, Examples 17 to 20 are plotted with • connected by short broken lines, and Examples 21 to 24 are plotted with + connected by middle broken lines, and Comparative Examples 1 to 4 are plotted with ▲ connected by thin solid lines; and FIG. 2 is prepared in which, the vertical axis represents the haze value, and the horizontal axis represents the visible light transmittance, and, similarly to FIG. 1, Examples 1 to 4 are plotted with ♦ connected by thick solid lines, Examples 5 to 8 are plotted with ■ connected by dash-dot-dash lines, Examples 9 to 12 are plotted with × connected by long broken lines, Examples 13 to 16 are plotted with * connected by dash-dot-dot-dash lines, and Examples 17 to 20 are plotted with • connected by short broken lines, Examples 21 to 24 are plotted with + connected by medium broken lines, and Comparative Examples 1 to 4 are plotted with ▲ connected by thin solid lines.

FIG. 1 shows that the near-infrared absorbers according to Examples 1 to 4, Examples 5 to 8, Examples 9 to 12, Examples 13 to 16, Examples 17 to 20, and Examples 21 to 24 have solar transmittances equal to or lower than those of the near-infrared absorbers according to Comparative Examples 1 to 4. In addition, FIG. 2 shows that the near-infrared absorbers according to Examples 1 to 4, and Examples 5 to 8 have haze values lower than those of the near-infrared absorbers according to Comparative Examples 1 to 4.

As described above, it is confirmed that the near-infrared absorbers according to Examples 1 to 24 can exhibit the near-infrared absorption property while securing transparency and have excellent optical properties, compared to those of the near-infrared absorbers according to Comparative Examples 1 to 4.

TABLE 1

| | Composition | | | | | | Near-infrared absorbing fine particles Dispersed particle size (nm) | Near-infrared absorber Plate thickness (mm) |
|---|---|---|---|---|---|---|---|---|
| | Near-infrared absorbing | Silane compound | | | | | | |
| Sample | | | Silicone | Silane coupling | Silnae coupling | | | |
| Near-infrared absorber | fine particles (mass %) | Alkoxysilane KBM-103 (mass %) | resin 217FLAKE (mass %) | agent KBM-903 (mass %) | agent KBM-5103 (mass %) | Acrylic resin | | |
| Example 1 | e | 0.045 | 0.01 | — | — | — | Balance | 72.4 | 1 |
| Example 2 | f | 0.045 | 0.01 | — | — | — | Balance | 71.1 | 2 |
| Example 3 | g | 0.094 | 0.02 | — | — | — | Balance | 76.5 | 1 |
| Example 4 | h | 0.094 | 0.02 | — | — | — | Balance | 70.2 | 2 |
| Example 5 | i | 0.045 | — | 0.01 | — | — | Balance | 120.6 | 1 |
| Example 6 | j | 0.045 | — | 0.01 | — | — | Balance | 122.2 | 2 |
| Example 7 | k | 0.094 | — | 0.02 | — | — | Balance | 130.0 | 1 |
| Example 8 | l | 0.094 | — | 0.02 | — | — | Balance | 139.9 | 2 |
| Example 9 | m | 0.045 | — | — | 0.01 | — | Balance | 175.2 | 1 |
| Example 10 | n | 0.045 | — | — | 0.01 | — | Balance | 169.7 | 2 |
| Example 11 | o | 0.094 | — | — | 0.02 | — | Balance | 180.7 | 1 |
| Example 12 | p | 0.094 | — | — | 0.02 | — | Balance | 182.5 | 2 |
| Example 13 | q | 0.045 | — | — | — | 0.01 | Balance | 146.8 | 1 |
| Example 14 | r | 0.045 | — | — | — | 0.01 | Balance | 150.9 | 2 |
| Example 15 | s | 0.094 | — | — | — | 0.02 | Balance | 155.2 | 1 |
| Example 16 | t | 0.094 | — | — | — | 0.02 | Balance | 165.0 | 2 |

| Sample | | Optical properties | | |
|---|---|---|---|---|
| | | Visible light transmittance (%) | Solar transmittance (%) | Haze value (%) |
| | Near-infrared absorber | | | |
| Example 1 | e | 81.6 | 51.6 | 1.1 |
| Example 2 | f | 74.2 | 39.2 | 1.7 |
| Example 3 | g | 71.2 | 35.1 | 1.8 |
| Example 4 | h | 58.4 | 24.6 | 2.7 |
| Example 5 | i | 80.0 | 49.1 | 1.7 |
| Example 6 | j | 71.7 | 36.7 | 2.6 |
| Example 7 | k | 69.5 | 33.9 | 2.8 |
| Example 8 | l | 56.2 | 23.4 | 4.1 |
| Example 9 | m | 81.2 | 50.9 | 2.0 |
| Example 10 | n | 70.5 | 35.5 | 3.0 |
| Example 11 | o | 69.1 | 33.3 | 3.3 |
| Example 12 | p | 55.4 | 22.5 | 4.9 |
| Example 13 | q | 80.9 | 51.3 | 1.8 |
| Example 14 | r | 72.0 | 37.4 | 2.8 |
| Example 15 | s | 69.2 | 33.2 | 3.1 |
| Example 16 | t | 55.8 | 23.1 | 4.6 |

TABLE 2

| Sample | Composition | | | | | Near-infrared absorbing fine particles | Near-infrared absorber | Optical properties | | |
|---|---|---|---|---|---|---|---|---|---|---|
| | Near-infrared absorber | Near-infrared absorbing fine particles (mass %) | Silane compound | | Acrylic resin | Dispersed particle size (nm) | Plate thickness (mm) | Visible light transmittance (%) | Solar transmittance (%) | Haze value (%) |
| | | | Alkoxysilane KBM-3063 (mass %) | Alkoxysilane KBM-7503 (mass %) | | | | | | |
| Example 17 | u | 0.045 | 0.01 | — | Balance | 150.0 | 1 | 80.5 | 50.1 | 1.8 |
| Example 18 | v | 0.045 | 0.01 | — | Balance | 152.9 | 2 | 70.9 | 35.5 | 2.9 |
| Example 19 | w | 0.094 | 0.02 | — | Balance | 160.1 | 1 | 69.0 | 33.4 | 3.1 |
| Example 20 | x | 0.094 | 0.02 | — | Balance | 158.2 | 2 | 55.2 | 22.5 | 4.7 |
| Example 21 | y | 0.045 | — | 0.01 | Balance | 150.2 | 1 | 81.2 | 51.1 | 1.8 |
| Example 22 | z | 0.045 | — | 0.01 | Balance | 155.1 | 2 | 72.5 | 36.5 | 2.8 |
| Example 23 | α | 0.094 | — | 0.02 | Balance | 156.5 | 1 | 70.3 | 34.4 | 3.0 |
| Example 24 | β | 0.094 | — | 0.02 | Balance | 160.2 | 2 | 56.3 | 23.5 | 4.4 |
| Comparative Example 1 | γ | 0.045 | — | — | Balance | 210.9 | 1 | 80.4 | 51.2 | 2.1 |
| Comparative Example 2 | δ | 0.045 | — | — | Balance | 221.9 | 2 | 71.4 | 37.4 | 3.3 |
| Comparative Example 3 | ε | 0.094 | — | — | Balance | 245.1 | 1 | 68.5 | 33.5 | 3.7 |
| Comparative Example 4 | ζ | 0.094 | — | — | Balance | 250.3 | 2 | 54.0 | 22.1 | 5.7 |

The invention claimed is:

1. A near-infrared absorbing material fine particle dispersion comprising,
composite tungsten oxide fine particles, and
a silane compound, in an acrylic resin, wherein:
the composite tungsten oxide fine particles are represented by general formula $M_xW_yO_z$ in which the M element is one or more alkali metals, the W is tungsten, the O is oxygen, the x, the y, and the z satisfy $0.20 \leq x/y \leq 0.37$ and $2.2 \leq z/y \leq 3.0$,
the silane compound is a silicone resin,
the silane compound has a phenyl group as a functional group,
a monomer unit forming the silicone resin is represented by $R\text{—}SiO_{1.6}$ and the R represents a hydrogen atom or an organic group,
the composite tungsten oxide fine particles, the silicone resin, and the acrylic resin are uniformly mixed in the near-infrared absorbing material fine particle dispersion, and
a content of the silane compound is 1 part by mass or more and 200 parts by mass or less with respect to 100 parts by mass of the composite tungsten oxide fine particles.

2. The near-infrared absorbing material fine particle dispersion according to claim 1,
wherein the weight average molecular weight of the silicone resin is 1,500 or more and 200,000 or less.

3. The near-infrared absorbing material fine particle dispersion according to claim 1,
wherein the dispersed particle size of the composite tungsten oxide fine particle is 1 nm or more and 200 nm or less.

4. The near-infrared absorbing material fine particle dispersion according to claim 1,
wherein the M element is one or more elements selected from Cs and Rb.

5. The near-infrared absorbing material fine particle dispersion according to claim 1,
wherein the composite tungsten oxide fine particles comprise composite tungsten oxide fine particles, each particle having a hexagonal crystal structure.

6. The near-infrared absorbing material fine particle dispersion according to claim 1,
wherein the surface of the composite tungsten oxide fine particle is coated with an oxide containing one or more elements selected from Si, Ti, Zr, and Al.

7. A near-infrared absorber,
which is obtained by molding the near-infrared absorbing material fine particle dispersion according to claim 1 into any one shape selected from a plate, a film, and a thin film.

8. A near-infrared absorber laminate, comprising the near-infrared absorber according to claim 7 laminated on a base material.

9. A laminated structure for near-infrared absorption,
wherein the near-infrared absorber laminate according to claim 8 is opposed to a laminated plate selected from sheet glass, plastic plate, and plastic plate containing fine particles having near-infrared absorption function, or is present between two or more laminated plates selected from sheet glass, plastic plate, and plastic plate containing fine particles having near-infrared absorption function.

10. A laminated structure for near-infrared absorption, comprising the near-infrared absorber according to claim 7 present between two or more laminated plates selected from sheet glass, plastic plate, and plastic plate containing fine particles having near-infrared absorption function.

* * * * *